US008577182B1

(12) United States Patent
Goldman (10) Patent No.: US 8,577,182 B1
(45) Date of Patent: Nov. 5, 2013

(54) METHOD AND SYSTEM FOR AUTOMATICALLY CROPPING IMAGES

(71) Applicant: Sally A. Goldman, Palo Alto, CA (US)

(72) Inventor: Sally A. Goldman, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/719,770

(22) Filed: Dec. 19, 2012

Related U.S. Application Data

(62) Division of application No. 12/835,625, filed on Jul. 13, 2010, now Pat. No. 8,363,984.

(51) Int. Cl.
*G06K 9/32* (2006.01)

(52) U.S. Cl.
USPC .................... 382/298; 382/118; 382/293

(58) Field of Classification Search
USPC .............. 382/118, 276, 293, 298; 348/240.99
See application file for complete search history.

(56) References Cited

U.S. PATENT DOCUMENTS

| | | | |
|---|---|---|---|
| 5,210,799 A | 5/1993 | Rao | |
| 5,325,449 A | 6/1994 | Burt et al. | |
| 5,375,080 A | 12/1994 | Davies | |
| 5,488,674 A | 1/1996 | Burt et al. | |
| 5,566,246 A * | 10/1996 | Rao | 382/154 |
| 5,838,830 A | 11/1998 | Qian et al. | |
| 5,983,218 A | 11/1999 | Syeda-Mahmood | |
| 6,243,104 B1 | 6/2001 | Murray | |
| 6,282,317 B1 | 8/2001 | Luo et al. | |
| 6,285,788 B1 | 9/2001 | Sezan et al. | |
| 6,320,976 B1 | 11/2001 | Murthy et al. | |
| 6,356,658 B1 | 3/2002 | Sezan et al. | |
| 6,421,132 B1 | 7/2002 | Brajovic | |
| 6,643,416 B1 * | 11/2003 | Daniels et al. | 382/299 |
| 7,133,571 B2 | 11/2006 | Cheatle | |
| 7,477,800 B2 | 1/2009 | Avidan et al. | |
| 7,606,442 B2 | 10/2009 | Pilu | |
| 7,747,107 B2 | 6/2010 | Avidan et al. | |
| 7,978,918 B2 | 7/2011 | Scalise et al. | |
| 8,009,921 B2 | 8/2011 | Csurka | |
| 8,132,096 B1 | 3/2012 | Widdowson et al. | |
| 8,175,376 B2 | 5/2012 | Marchesotti et al. | |

(Continued)

OTHER PUBLICATIONS

Comaniciu, D. et al., Mean Shift: A Robust Approach Toward Feature Space Analysis, IEEE Transactions on Pattern Analysis and Machine Intelligence, vol. 24, No. 5, May 2002, pp. 603-619.

(Continued)

*Primary Examiner* — Shefali Goradia
(74) *Attorney, Agent, or Firm* — Brian J. Colandreo; Michael T. Abramson; Holland & Knight LLP (57) ABSTRACT

The present invention relates to methods and systems for automatic image cropping. An automatic image cropping system includes a downsampling system, a saliency analyzer, a spatial scatter, and a face detector configured to detecting one or more faces within the image. The saliency value of each pixel not associated with a detected face within the image is adjusted if one or more faces within the image are detected. A search system defines a saliency region based on a total value of saliency values within the saliency region and on a parameter, where the parameter value is based on a relative importance of a false positive pixel to a false negative pixel. The search system also defines a crop region using an aspect ratio that includes the saliency region and determines a position of the crop region based the saliency values within the crop region by performing a one dimensional search.

20 Claims, 9 Drawing Sheets

(56) References Cited

U.S. PATENT DOCUMENTS

| | | | |
|---|---|---|---|
| 8,184,928 B2 | 5/2012 | Mrityunjay et al. | |
| 8,213,745 B2 | 7/2012 | Kumar et al. | |
| 8,218,895 B1 | 7/2012 | Gleicher et al. | |
| 2002/0191861 A1 | 12/2002 | Cheatle | |
| 2006/0193536 A1 | 8/2006 | Pilu | |
| 2008/0219587 A1 | 9/2008 | Avidan et al. | |
| 2008/0260347 A1 | 10/2008 | Widdowson | |
| 2008/0267528 A1 | 10/2008 | Avidan et al. | |
| 2009/0208118 A1 | 8/2009 | Csurka | |
| 2009/0251594 A1 | 10/2009 | Hua et al. | |
| 2010/0073402 A1* | 3/2010 | Delia et al. | 345/625 |
| 2010/0091330 A1 | 4/2010 | Marchesotti et al. | |
| 2010/0183242 A1 | 7/2010 | Brand | |
| 2010/0183243 A1 | 7/2010 | Brand | |
| 2010/0215259 A1 | 8/2010 | Scalise et al. | |
| 2010/0226564 A1 | 9/2010 | Marchesotti et al. | |
| 2011/0069224 A1 | 3/2011 | Gross et al. | |
| 2011/0085745 A1 | 4/2011 | Kumar et al. | |
| 2011/0091132 A1 | 4/2011 | Kumar et al. | |
| 2011/0103643 A1* | 5/2011 | Salsman et al. | 382/103 |
| 2011/0182502 A1 | 7/2011 | Liang | |
| 2011/0211770 A1 | 9/2011 | Wang et al. | |
| 2011/0262055 A1 | 10/2011 | De Haan et al. | |
| 2012/0002107 A1 | 1/2012 | Damkat et al. | |
| 2012/0120311 A1 | 5/2012 | De Haan | |
| 2012/0121204 A1 | 5/2012 | Ding et al. | |

OTHER PUBLICATIONS

Duda, R. et al., Pattern Classification, Second Edition, Wiley Interscience, 2000.

Lampert, C. et al., Beyond Sliding Windows: Object Localization by Efficient Subwindow Search, in Proc. of the IEEE Conf. on Computer Vision and Pattern Recognition (CVPR), 2008, 8 pages.

* cited by examiner

METHOD AND SYSTEM FOR AUTOMATICALLY CROPPING IMAGES

CROSS-REFERENCE TO RELATED APPLICATION

This application is a divisional of U.S. application Ser. No. 12/835,625, filed Jul. 13, 2010, (now allowed), which is incorporated by reference herein in its entirety.

BACKGROUND

1. Field of the Invention

Embodiments of the present invention relate to the automatic cropping of images.

2. Related Art

Cropping refers to the identification and/or removal of an area from an image. Typically such image manipulation is manually performed to remove unwanted subject material from the image to improve the overall composition of the image, or to emphasize a certain set of subject matter. For example, cropping a portrait image may emphasize a person's facial features whereas cropping an image containing a person playing a musical instrument may feature more than just the person's face. Such a cropped image may include additional subject matter, such as a portion, or the entire musical instrument. Cropping is also performed to compensate between different aspect ratios. For example a widescreen 16:9 format may be desired to showcase a landscape image of a mountain range that was originally taken in a 4:3 aspect ratio.

The cropping of a photographic image can be very subjective. However, there are a number of standard compositional rules that can be employed to select the area to be cropped. The "rule of thirds" dictates that an image is divided into nine equal parts with two equally-spaced horizontal lines and two equally-spaced vertical lines, where the important composition elements should be placed along the lines or at their intersections. Other rules include symmetrical balance, asymmetrical balance, radial balance, and simplicity. However, these rules require an artistic judgment of what rule to apply when as well as an artistic decision of what element are to be included within the final cropped image.

BRIEF SUMMARY

Therefore, what is needed is a method and system to perform automatic image cropping based on an analysis of the image and input parameters.

In an embodiment of the present invention, there is provided a computer-implemented method for image cropping that includes downsampling an image to a threshold number of pixels and computing a saliency value for each pixel based on one or more detected color clusters and a spatial scatter of the one or more color clusters. The method then performs a detection to detect if there is a presence of one or more faces within the image. If there is a detected face then the method calls for adjusting the saliency value of each pixel not associated with the detected faces. Then a saliency region is defined based on the total value of saliency values within the saliency region and on a parameter, where the parameter value is based on a relative importance of a false positive pixel to a false negative pixel. A crop region is then defined, based on a specified aspect ratio, which includes the saliency region. The method specifies determining a position of the crop region based on the saliency values within the crop region while performing a one dimensional search and returning the final crop for the image based on the one dimensional search.

In a further embodiment of the present invention, there is provided a system for image cropping consisting of a downsampling system configured to downsample an image to a threshold number of pixels, a saliency analyzer configured to compute a saliency value for each pixel based on one or more detected color clusters and a spatial scatter of the one or more color clusters, and a face detector configured to detect one or more faces within the image. The face detector adjusts the saliency value of each pixel not associated with the one or more detected faces within the image if one or more faces within the image are detected. A search system is configured to define a saliency region based on a total value of saliency values within the saliency region and on a parameter, where the parameter value is based on a relative importance of a false positive pixel to a false negative pixel. The search system also defines a crop region based on a specified aspect ratio where the crop region includes the saliency region. The search system also determines a position of the crop region based on the saliency values within the crop region by performing a one dimensional search. A cropping system crops the image based on the one dimensional search.

Further embodiments and features, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the information contained herein.

BRIEF DESCRIPTION OF THE DRAWINGS/FIGURES

Embodiments of the invention will now be described, by way of example only, with reference to the accompanying drawings in which corresponding reference symbols indicate corresponding parts. Further, the accompanying drawings, which are incorporated herein and form part of the specification, illustrate the embodiments of present invention and, together with the description, further serve to explain the principles of the invention and to enable a person skilled in the relevant art(s) to make and use the invention.

The features of various embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The embodiments described herein are referred in the specification as "one embodiment," "an embodiment," "an example embodiment," etc. These references indicate that the embodiment(s) described can include a particular feature, structure, or characteristic, but every embodiment does not necessarily include every described feature, structure, or characteristic. Further, when a particular feature, structure, or characteristic is described in connection with an embodiment, it is understood that it is within the knowledge of one skilled in the art to affect such feature, structure, or characteristic in connection with other embodiments whether or not explicitly described.

Figure 1:
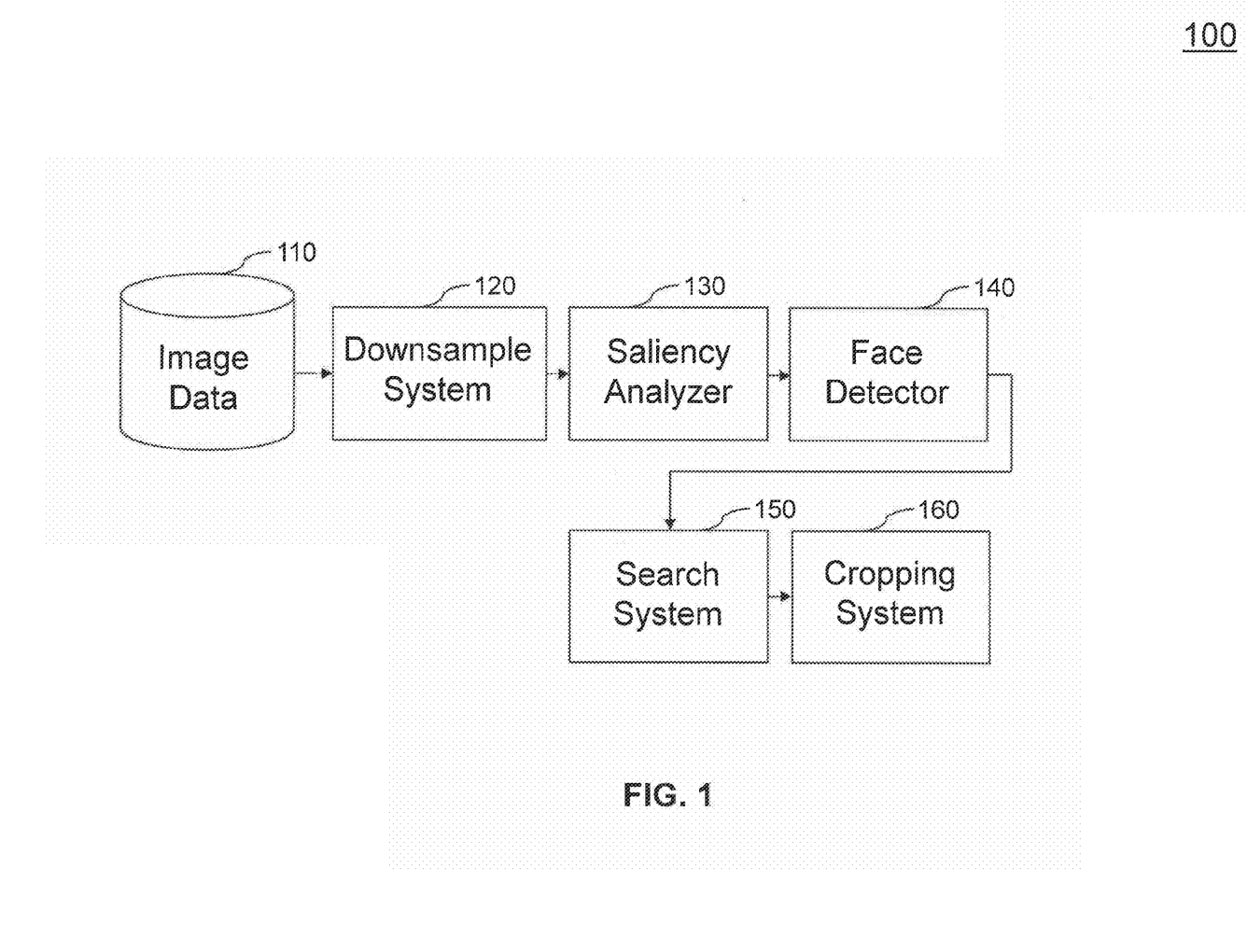
FIG. 1 illustrates a system for automatic image cropping, according to an embodiment of the present invention.

FIG. 1 illustrates system 100 of an automatic image cropping system, according to an embodiment of the present invention. In the example shown in FIG. 1, system 100 includes image data storage 110, downsample system 120, saliency analyzer 130, face detector 140, search system 150, and cropping system 160.

I. Downsampling

System 100 illustrates the functionality blocks within an automatic image cropping system. Image data is stored in image data storage 110 where the data can exist in any image format, for example, jpg, bmp, exif, tiff, raw, png, gif, ppm, pgm, pbm, pnm, cgm, svg, pns, jps, or mpo, or any other format, whether the image is two dimensional or three dimensional. In order to provide timely processing within system 100, downsample system 120 performs a sizing reduction to an image from image data storage 110 to obtain a downsampled image. As an example, a 6 megapixel digital camera typically captures a 3,072×2,048 pixel image yielding 6,291,456 pixels of image data. Downsample system 120 reduces the number of pixels in an image below a set threshold. In an embodiment, the threshold can be set to approximately 6000 pixels. In other embodiments, higher or lower threshold limits can be used to suit the applicable application. For example, a higher threshold can be set for usage in applications where a higher degree of definition is desired, e.g., print media.

In another embodiment the downsampled image can be a portion of a larger image wherein the image to be cropped is itself a cropped image. As an example, the cropping system can be limited to process only a specified area of an image where the specified area would be considered a separate image pertaining to the approach described within this application.

II. Saliency

In an embodiment, saliency analyzer 130 processes the downsampled image from downsample system 120 by first computing a saliency value for each pixel within the image. Saliency analyzer 130 computes a saliency value between 0 and 1 for each pixel where the value indicates the degree to which that pixel is believed to be part of a desired portion of the image. For example, in a black and white representation of the saliency values for an image, a portion of the image with a saliency value of 1 will be shown as white, being the highest saliency value, and a saliency value of 0 will be shown as black, being the lowest saliency value. Thus, darker areas with a lower saliency value tend to indicate background portions of the image that are not as important as the whiter portions of the image with higher saliency values.

In one example, in order to calculate the saliency value, saliency analyzer 130 first runs a mean shift algorithm to define and create color modes. Mean shift is a non-parametric mode finding/clustering algorithm that makes no assumptions about the shape of the distributions or the number of modes. As an example, 1/25 of the pixels can be used as starting points for a gradient search for a mode that uses a total of 25 pixels as the entire bandwidth. Modes that reach a threshold, e.g., 0.2%, of the searches are kept.

Representative works of this type of color cluster and non-parametric density estimation can be found in, for example, Duda, Hart, and Stork's, "Pattern Classification," Second Edition, Wiley Interscience, 2000, while representative works of mean shift algorithms that are used to determine the quantity of color modes can be found in, for example, Comaniciu and Meer's, *"Mean Shift: A robust approach toward feature space analysis,"* IEEE Pattern Analysis and Machine Intelligence, May 2002.

The mean shift algorithm computes a set M of modes m1 ... mk, where k is the number of modes. For each pixel x and mode m, saliency analyzer 120 computes a probability $p\_m(x)$ that pixel x belongs to mode m. For each pixel x, the sum over all modes of $p\_m(x)$ equals 1. Therefore, $p\_m1(x), \ldots p\_mk(x)$, where k is again the number of modes, forms a probably distribution.

Saliency analyzer 130 next computes x and y coordinates of each centroid $c\_m$ for each mode m. Let I be the image being processed. This is accomplished, for example, where:

$$x\text{-coordinate of } c\_m = \Sigma_{p \in I} p\_m(p) * x\text{-coordinate of } p;$$

and $$y\text{-coordinate of } c\_m = \Sigma_{p \in I} p\_m(p) * y\text{-coordinate of } p.$$

Saliency analyzer 130 next computes the spatial variance for each cluster in each mode m. This step is applied for all k modes computed by the mean shift algorithm. Thus, w(m) is defined as:

$$w(m) = \Sigma_{p \in I} p\_m(p).$$

The spatial variance for cluster m is:

$$1/w(m) * \Sigma_{p \in I}(p\_m(p) * (\text{dist}\_v(c\_m,p) + \text{dist}\_h(c\_m,p))$$

Where $\text{dist}\_v(c\_m, p)$ is the vertical distance between p and the x-coordinate of $c\_m$ and $\text{dist}\_h(c\_m, p)$ is the horizontal distance between p and the y-coordinate of $c\_m$. This concept can be viewed as a weighted average of the distance between the center of the cluster and the pixels in the cluster where each pixel can be thought of as being assigned to multiple clusters weighted via the probability of belonging to each cluster. Saliency analyzer 130 then renormalizes the spatial variance across all clusters in the range [0,1].

Once the renormalization of the spatial variance is complete, saliency analyzer 130 computes a center weighted bias for each cluster. This step is designed to slightly favor objects being near the center of the image as likely being more important to the image. The center weighted bias for each cluster m is:

$$1/w(m) * \Sigma_{p \in f}(p\_m(p) * \text{Euclidean distance from } p \text{ to image focus } f)$$

As an example, f can be horizontally centered and vertically ⅓ of the way from the top, as images that include faces and other important objects place such information in the upper portion of the image. Saliency analyzer 130 then renormalizes the center weighted bias across all clusters in the range [0,1].

After the renormalization of the center weighted bias is complete, saliency analyzer 130 assigns a saliency value to each pixel in the image. This step is accomplished by taking the sum over all clusters for pixel x, its saliency value f(x) being computed as follows where M is the set of modes/clusters:

$$f(x) = \Sigma_{m \in M} p\_m(x) * (1 - \text{spatial\_variance}(m)) * (1 - \text{center\_weighted\_bias}(m))$$

III. Face Detection

Face detector 140 uses known face recognition techniques that are capable of face and facial feature recognition in order to identify any faces within the image from image data storage 110. Face detector 140, for example, can be known face recognition software including, but not limited to, Neven Vision from Nevenengineering, Inc. The face recognition software and the process of identifying any faces is done on the original image independently of the processes described above regarding image data storage 110, downsample system 120, and saliency analyzer 130. As such, facial recognition can be performed using an image from image data storage 110 prior or concurrently to the downsampling and saliency processing.

Figure 2:
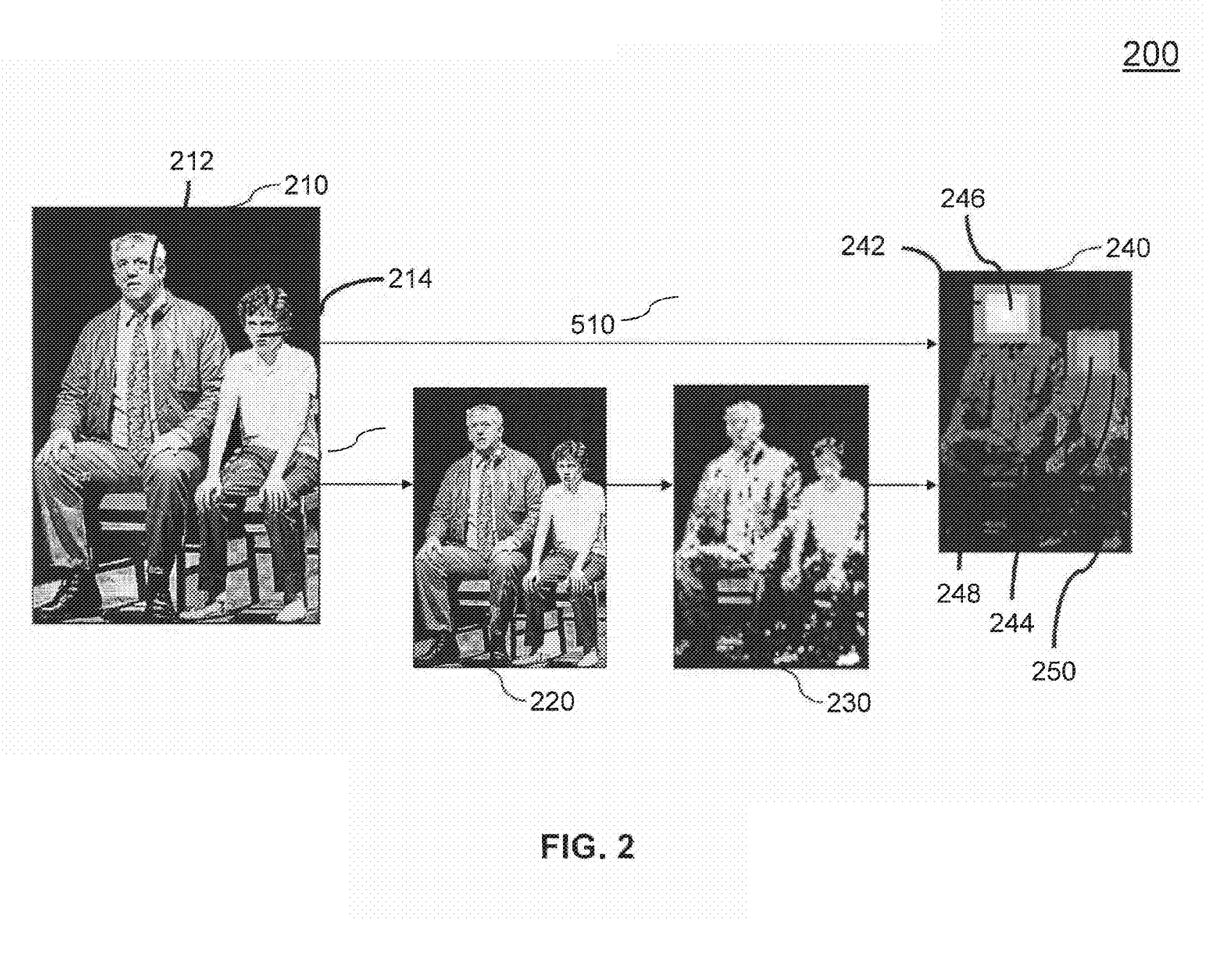
FIG. 2 illustrates a sequence of steps for an image being processed by a system for automatic image cropping, according to an embodiment of the present invention.

FIG. 2 illustrates cropping sequence 200 of an automatic image cropping system, according to an embodiment of the present invention. In the example shown in FIG. 2, sequence 200 includes original image 210, faces 212 and 214, downsampled image 220, saliency map 230, blended image 240, detected face 246 with border 242, detected face 248 with border 244, and adjusted pixels 250.

An example of the face detection process is shown in FIG. 2 where original image 210 is received from image data storage 110 where face 212 and face 214 will be detected. In an embodiment, face detector 140 performs the detection image 210 prior to, or in parallel with, the downsampling of image 210 and the saliency map 230. The downsampling of original image 210 by downsample system 120 results in downsampled image 220 that is then processed by saliency analyzer 130 to produce saliency map 230. Saliency map 230 displays the saliency values of each pixel where, as described above, each pixel has a saliency value between 0 and 1 that indicates the degree to which that pixel is believed to be part of a desired portion of the image where a saliency value of 1 will be shown as white, e.g., high degree, and a saliency value of 0 will be shown as black, e.g., low degree.

During tests involving Neven Vision software various parameters were set to determine a set of optimal settings for detection. For example, the minimum eye distance set to 21, maximum eye distance set to 1000, minimum confidence set to 0, and maximum roll set to 20. Any and all faces that are detected by face detector 140 are stored in the set of faces F where for each face f in F the face detection software generates a box indicating the location of a face. In addition, a border may be generated around the pixels of any detected face in order to provide a buffer zone for the detected faces.

IV. Blending Detected Faces

If a face is detected by face detector 140 in the image from image data storage 110 face detector 140 will increase the relative importance of the pixels associated with a facial image as compared to pixels not associated with a facial image. This is accomplished by blending the saliency values calculated by saliency analyzer 130 with the location of the facial features identified by face detector 140. The blending process is accomplished by reducing the saliency values for those pixels not associated with a face. If face detector 140 does not detect any faces then no changes are made.

Given that face detector 140 detects one or more faces in an image from image data storage 110 then all of the saliency values of pixels not associated with a detected face are reduced in value by a factor, e.g., 35%. As an example, the reduction in saliency values can be computed as:

$$f(x) = f(x) - 0.35 * f(x) = 0.65 * f(x)$$

The reduction of the saliency value of a non-facial pixel by a factor ensures that any detected faces are given a higher priority during the cropping operation that will be discussed later.

An example of the blending process is illustrated in FIG. 2. Face 212 is shown as detected face 246, and face 214 is shown as detected face 248 in blended image 240. In this example, both detected faces are surrounded by a border, e.g., border 242 around detected face 246, and border 244 around detected face 248. Additionally, note that the pixels 250 in blended image 240 are darker than the corresponding pixels in saliency map 230 due to the reduction of non-facial saliency values.

While detected faces 244 and 246 are shown with a consistent shade of grey indicating a constant saliency value, in another embodiment the saliency value of each pixel in a detected face is adjusted based on its position. Thus, for example, each face f in F is adjusted in the following manner:

"A" is defined to be the maximum area of all faces in F

An adjustment value is defined for each face f as area (f)/A where for all faces, except the largest, the adjustment value is capped to 0.85

Define max_dist (f) as the distance from the center of f to a corner of f

For each pixel x in face f define its distance (x,f)=distance of x from center of f divided by max_dist (f)

For face f in F assign a value to pixel x=adjustment_value (f)*(1.0−0.1*distance (x,f))

For any pixel x in a buffer area around f, e.g., 25% of height and 33% of width, set the saliency value for x, f(x)=0.6

If a pixel falls in more than one face, including the buffer region, the highest value is assigned In another embodiment, when multiple faces are detected, the larger face is deemed to be more important than the small face. This importance is reflected by assigned a lower adjustment value to a smaller face. Therefore, a larger face will typically have a higher total saliency value than a smaller face.

V. Saliency Region

To determine the saliency region a saliency rectangle is determined. The saliency rectangle is defined as a rectangular area within the image borders that contains the most salient area with the desired aspect ratio and based on the value of a cropping parameter that determines the size of the cropped area. The value of the parameter can be user selectable but can also be determined automatically by content analysis.

The size of the saliency region is determined based on the specified cropping parameter value. Typically the size of the saliency region, saliency region, is dependent upon the desired effect of the finished crop. As previously mentioned, if the subject matter of the cropping operation is determined to include only faces then a close in crop that fills the cropped area with faces would probably be desirable, whereas if the subject matter included a face and another important object, such as a hand held musical instrument, then the desired crop may be a larger area so that both the person and the instrument are included within in the cropped image. Search system 150 controls the size of the saliency region to be defined.

Figure 3:
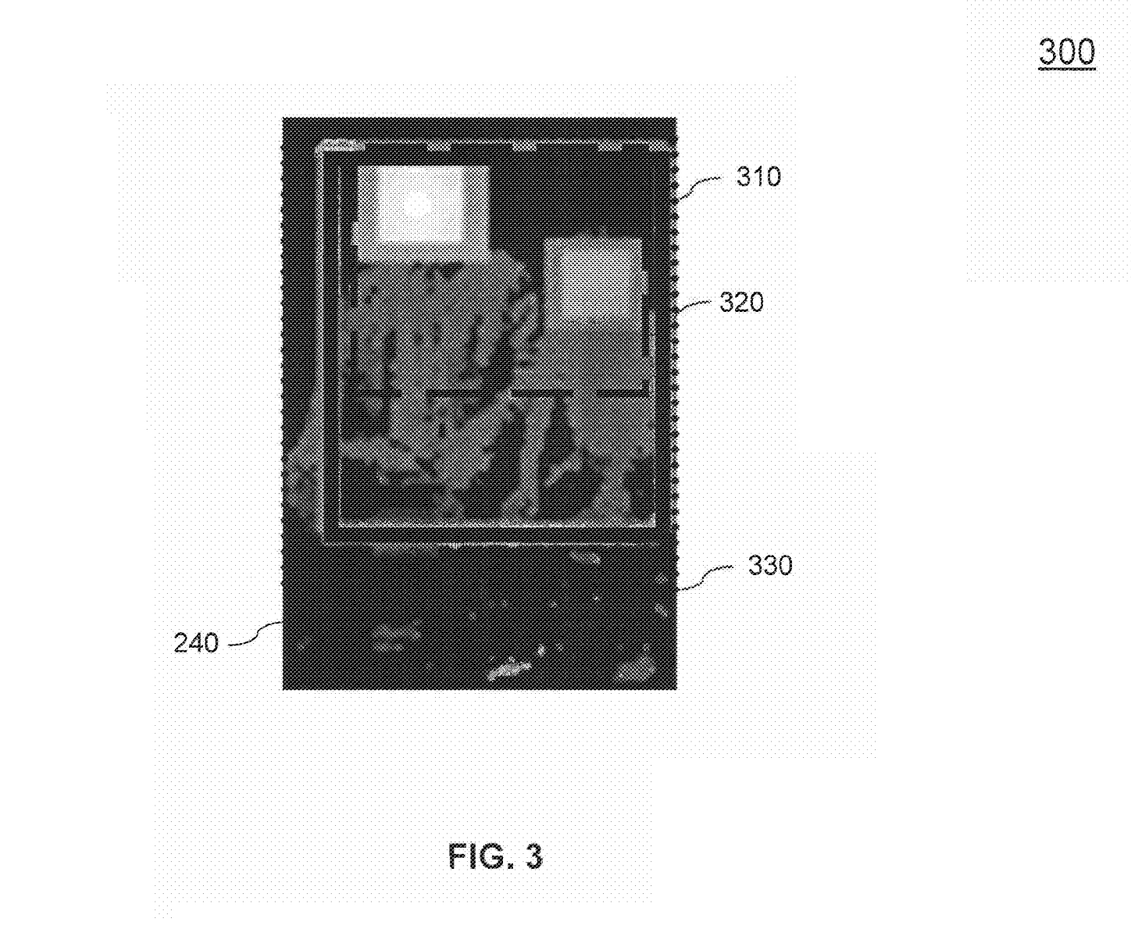
FIG. 3 illustrates defining multiple saliency regions based on a parameter value in an example image, according to an embodiment of the present invention.

FIG. 3 illustrates system 300 of an automatic image cropping system, according to an embodiment of the present invention. In the example shown in FIG. 3, system 300 illustrates defining a saliency region. System 300 includes blended image 240 with saliency region 310 based on a default crop parameter, saliency region 320 based on a tight crop parameter, and saliency region 330 based on a wide crop parameter.

For example, let w be the cropping parameter that is used to control the size of the saliency region to be defined by search system 150. The factor signifies that each false negative error is equal in cost to w false positive errors. Cropping parameter w is then combined with an Efficient Subwindow Search (ESS) to find the rectangular saliency region R* in the image that maximizes:

$$\text{quality}(R) = w^*(\Sigma_{x \in R} f(x)) + \Sigma_{x \notin R}(1 - f(x))$$

Representative works concerning ESS can be found, for example, in Lampert, Blaschko, and Hoffman's, "Beyond Sliding Windows: Object Localization by Efficient Subwindow Search," *IEEE Computer Vision and Pattern Recognition (CVPR)*, 2008.

FIG. 3 illustrates three different resulting saliency regions based on different values for the parameter w generated by search system 150. Saliency region 310 represent a region with a default crop parameter, e.g., w=20, saliency region 320 represents a region with a tight crop parameter, e.g., w=10, and saliency region 330 represents a region with a wide crop parameter, e.g., w=40.

VI. Crop Region

Once a desired saliency region is generated by search system 150, search system 150 then defines a crop region R** that takes into account any specified aspect ratio. If no aspect ratio is specified than the saliency region R* discussed above in used as the R region to be discussed. However, if a desired aspect ratio, e.g., ratio of width to height, is specified then search system 150 computes a region R that is as small as possible so that R** contains R* but stays within the image boundary, e.g., blended image 240, while maintaining the requested aspect ratio. However, in some cases this may not be possible. For example, if an original image is very wide with a small vertical height and the specified aspect ratio is 1:1, e.g., a square, then in order to include all of R* and deliver a 1:1 aspect ratio, the R** crop area may exceed the image boundary of the original image, e.g., blended image 240, which would violate the crop region rule of staying within the image boundary.

However, in another embodiment, the user can specify a desired aspect ratio with an additional parameter, e.g., a percentage, in which the desired aspect ratio can be varied based on the additional parameter such that there is a better chance that all of R* region is contained in R** while not exceeding the original image boundary. If the R* region still cannot be contained in R** without exceeding the original image boundary then the system can either produce an error report or override the requested aspect ratio request.

In another embodiment, search system 150 is provided with a specific set of aspect ratios in which search system 150 identifies one of the aspect rations that is determined to be best suited for a particular image. For example, if search system 150 is given four specific aspect ratios and using the process described above where no aspect ratio is specified, search system 150 would normally, for example, pick an aspect ratio in between the second and third specified ratios. In this embodiment search system 150 picks whether, for example, the crop selected for the second or third aspect ratio is best suited for the image based on selecting the crop R that maximizes the importance measure "importance (R)" for rectangle R defined as:

$$\text{importance}(R) = \Sigma_{x \in R} f(x) + \text{the fraction of the image area covered by R}$$

The second factor above, the fraction of the image area being covered by the crop, is added to handle the special case when the saliency map consists of all null values, e.g., image is comprised totally of background. Therefore, search system 150, in the above example, would identify the proper aspect ratio by computing the best crop for each aspect ratio, and summing the saliency values of the crop computed for each specified aspect ratio, and add to those values the fraction of the image area being covered by the crop. Whichever aspect ratio's crop generates the highest importance value is the aspect ratio that is optimized for that particular image.

Figure 4:
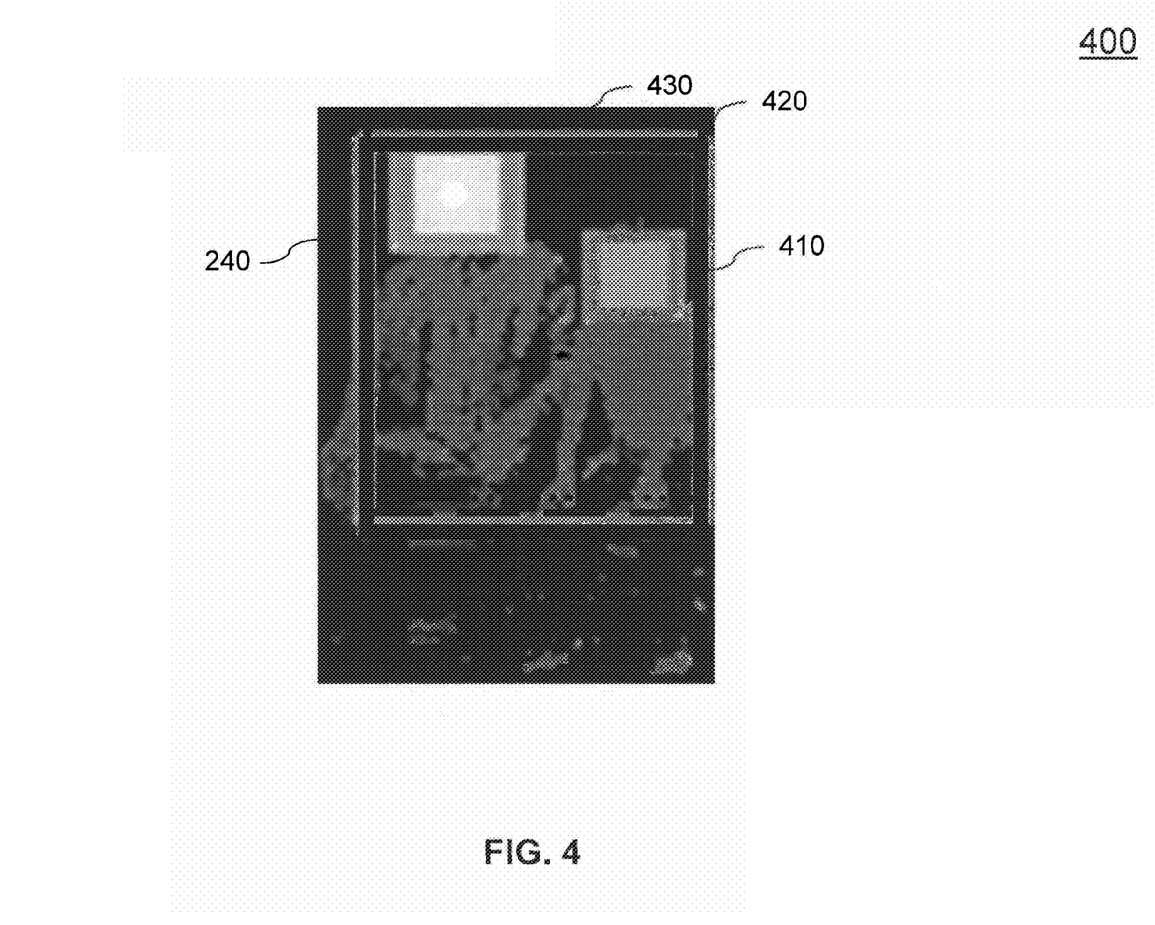
FIG. 4 illustrates multiple crop regions with a one dimensional vertical search, according to an embodiment of the present invention.

The horizontal and vertical dimensions of the crop region R are now fixed dimensions. However, search system 150 now determines the optimal position of crop region R by performing a one dimensional search. For example, FIG. 4 illustrates system 400 that includes a one dimensional search in the vertical direction, according to an embodiment of the current invention. In the example shown in FIG. 4, system 400 includes three possible crop regions R, shown as crop region R 410, crop region R 420, and crop region R 430.

All three crop regions 410, 420, and 430 are constrained in the horizontal direction because the size of crop regions 410, 420, and 430 cannot be any smaller in the horizontal direction without violating the rule of containing region R* while maintaining the specified aspect ratio, e.g., without eliminating a portion of the face of one or both persons. Therefore, the crop regions can only be moved in the vertical direction. Search engine 150 locates crop region R** wherein the quality (R) value is maximized, where:

$$\text{quality}(R) = w^*(\Sigma_{x \in R} f(x)) + \Sigma x \notin R(1 - f(x))$$

Figure 5A:
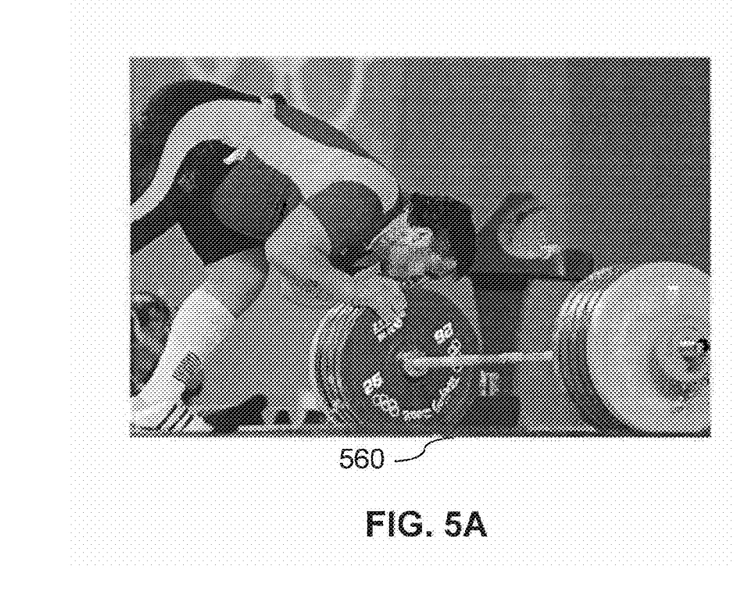
FIGS. 5A and 5B illustrate multiple crop regions with a one dimensional horizontal search, according to an embodiment of the present invention.
Figure 5B:
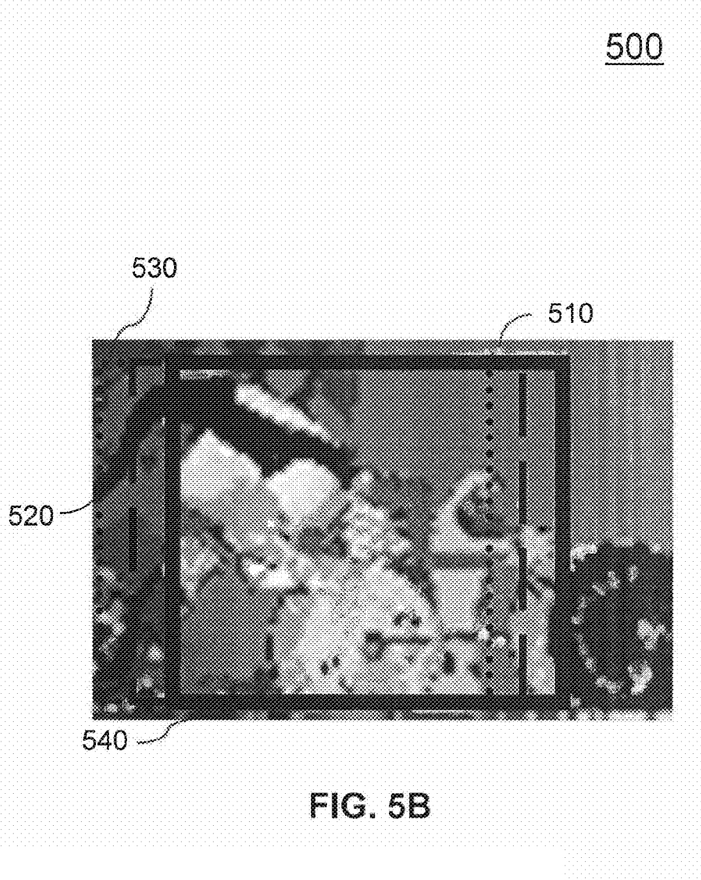

FIGS. 5A and 5B illustrate system 500 that includes a one dimensional search in the horizontal direction, according to an embodiment of the current invention. In the example shown in FIG. 5A, system 500 illustrates a horizontally based image 560, where FIG. 5B illustrates three possible crop regions R, shown as crop region R 510, crop region R 520, and crop region R 530 on saliency map 540.

As with the crop regions in FIG. 4 that were constrained in the horizontal direction, the three crop regions 510, 520, and 530 are similarly constrained, but in the vertical direction because the size of crop regions 510, 520, and 530 cannot be any smaller in the vertical direction without violating the rule of containing region R* while maintaining the desired aspect ratio, e.g., without eliminating a portion of the face of one or both persons. Therefore, the crop regions can only be moved in the horizontal direction. Search engine 150 locates crop region R** wherein the quality (R) value is maximized, where:

$$\text{quality}(R) = w^*(\Sigma_{x \in R} f(x)) + \Sigma x \notin R(1 - f(x)).$$

Note that in horizontally based image 560 there is no clear capture of the person's face. Thus, in saliency map 540 there is no indication of a detected face.

Search system 150 determines an optimal crop area R and positions crop area R where the quality (R) value is maximized, hereinafter referred to as quality (R) value. Search system 150, in an embodiment, performs a verification test to see if the quality (R) value is significantly greater than the quality (R) value if the crop area is positioned at a first or second default position that is a different position from where search system 150 has determined R** should be placed. The reason for this test is that there are two highly used positions for the placement of cropped images that are widely accepted, namely when the crop is fully centered and when the crop is horizontally centered and at the top of the image vertically.

In an embodiment, the first default position is a fully centered crop and the second default position is a crop horizontally centered and at the top of the image vertically. Search system 150 determines whether the image crop should be placed at a first or second default position in lieu of the previously determined R position where the quality (R) value was maximized using the following methodology. The first default position, e.g., fully centered crop, is analyzed by calculating the quality value in the first default position, e.g., quality ($R^{D1}$) value, and comparing it to the quality (R) value. If the quality ($R^{D1}$) value exceeds the quality (R) value by a first threshold, e.g., 1.5%, then the image will be placed at the first default position, e.g., fully centered, instead of at the previously determined position for R. In a similar manner, the second default position, e.g., horizontally centered and at the top of the image vertically, is analyzed by calculating the quality value in the second default position, e.g., quality ($R^{D2}$) value, and comparing it to the quality (R) value. If the quality ($R^{D2}$) value exceeds the quality (R) value by a second threshold, e.g., 5.5%, then the image will be placed at the second default position, e.g., horizontally centered and at the top of the image, instead of at the previously determined position for R**.

In another embodiment, cropping system 160 produces a confidence measure after the final crop is performed to indicate the likelihood that an important part of the image has been cropped out. There are some images that, for a specified aspect ratio, there is no clearly superior crop at the given aspect ratio. With a feedback of a confidence measure to the user then that person can be made aware of the potential loss of information. For example, the following values and explanation are generated to assist in the determination of a possible different aspect ratio, or the use of a different image.

1.0 at least 1 face, no cuts (e.g., partly cropped out of image)
0.9 faces(s) with none cut but some missing (e.g., cropped out totally)
0.8 no faces detected but saliency map is believed to be meaningful
0.7 good face(s) but also at least one slightly cut face
0.6 some fairly large face is extremely close to a border
0.5 good face(s) but also at least one is severely cut
0.4 all detected face(s) are slightly cut
0.3 faces occupy approximately >70% of crop so it is likely to be too tight to look good
0.2 all detected face(s) are severely cropped
0.0 very poor contrast image, so no meaningful crop can be computed VII. No-Crop Region In an embodiment, cropping system 160 determines a no-crop region of the image in which no portion of the no-crop region is to be eliminated or removed from the final cropped image. The following explanation shows an example for determining a no-crop region that is defined as a rectangular area.

For a specific image, during the time when the saliency map is being computed, an average saliency value for the edge pixels of the image, which are likely to be part of the background, is computed. This value, e.g., avg_edge_saliency, is based on pixels that have a saliency value that are less than a certain threshold, e.g., 0.35, where the value of the threshold indicates that it is likely that the pixel is part of the background. In addition, the sum over all the saliency values is computed, e.g., total saliency. The remaining steps in performing the saliency analysis are not impacted by the inclusion of the no-crop region computation.

The first border of the no-crop region, e.g., the left border of the rectangular no-crop region, is determined by considering the columns of the saliency map from left to right. For every pixel that has a saliency value greater than a second threshold times the average edge saliency calculated above, e.g., 1.1*avg_edge_saliency, that value is added to a running sum. The rightmost column for which the running sum divided by total-saliency has a value at least equal to or greater than a third threshold, e.g., 0.025, is identified as the left border. In an embodiment, a small border is introduced by moving back to the left by the saliency_map_width times a constant, e.g., 0.025.

The second border of the no-crop region, e.g., the right border of the rectangular no-crop region, is determined in an analogous manner to the first, e.g., left border, just discussed. The second border determination originates from the rightmost column and moves to the left to locate the rightmost column for which the running sum divided by total saliency has a value at least equal to or greater than the third threshold, e.g., 0.025. In an embodiment, a small border is introduced by moving back to the right by the saliency_map_width times a constant, e.g., 0.025.

The third border of the no-crop region, e.g., the top border of the rectangular no-crop region, is determined in an analogous manner to the first, e.g., left border, just discussed. The third border determination originates from the uppermost row and moves down to locate the uppermost row for which the running sum divided by total saliency has a value at least equal to or greater than the third threshold, e.g., 0.025. In an embodiment, a small border is introduced by moving upwards by the saliency_map_height times a constant, e.g., 0.025.

The fourth border of the no-crop region, e.g., the bottom border of the rectangular no-crop region, is determined in an analogous manner to the third, e.g., top border, just discussed. The fourth border determination originates from the lowermost row and moves up to locate the lowermost row for which the running sum divided by total saliency has a value at least equal to or greater than the third threshold, e.g., 0.025. In an embodiment, a small border is introduced by moving downwards by the saliency_map_height times a constant, e.g., 0.025.

VIII. Border Generation

In an embodiment, search system 150 adds a border consisting of additional image pixels around the crop area R**, or crop area $R^{D1}$ or $R^{D2}$ if applicable. The addition of additional image pixels presents a more atheistically pleasing overall image to the viewer. The number of border pixels added to the image is constant on all sides such that the overall aspect ratio is not altered. In another embodiment, the border consist of varying numbers of pixels based on the size of the crop, e.g., wide versus tight.

Figure 6:
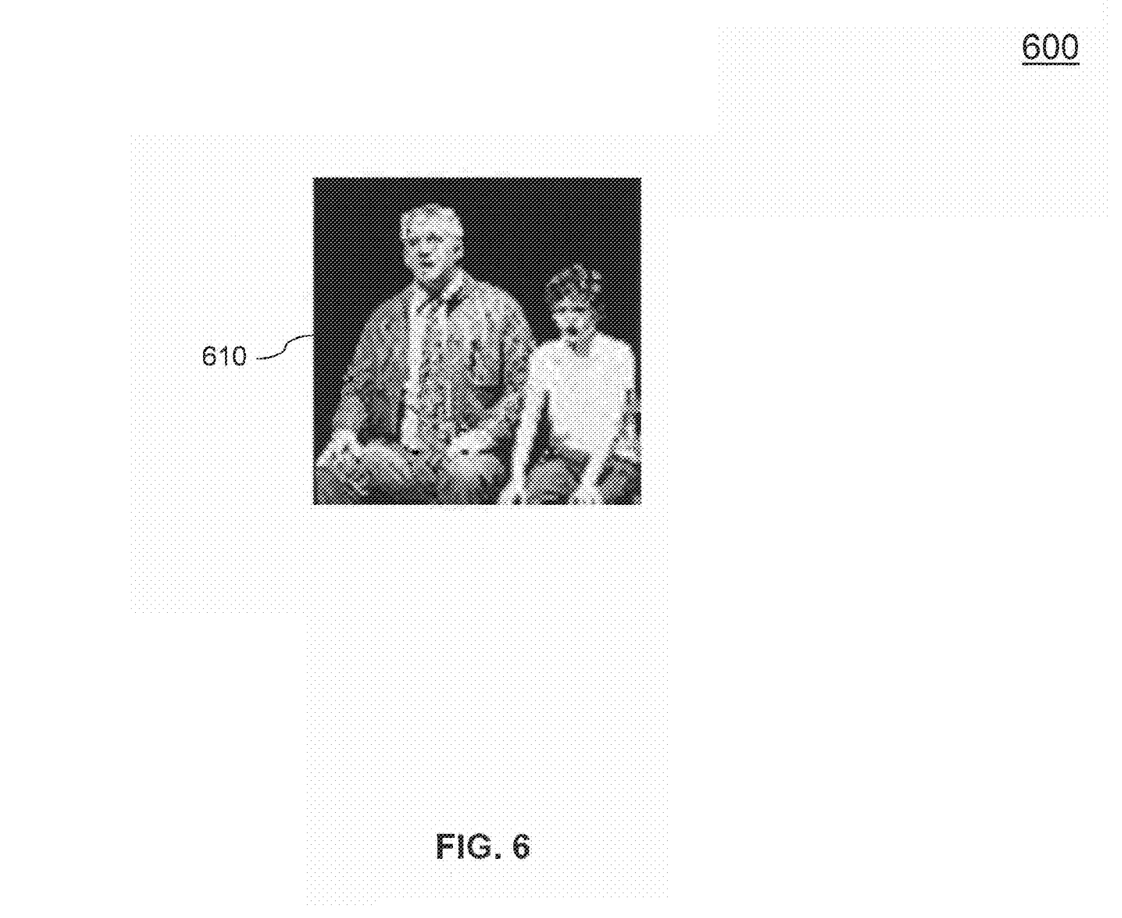
FIG. 6 illustrates a portion of the image selected to be cropped, according to an embodiment of the present invention.

FIG. 6 illustrates system 600 that illustrates an automatically cropped image 610 that includes a border, according to an embodiment of the current invention.

IX. Method

Figure 7:
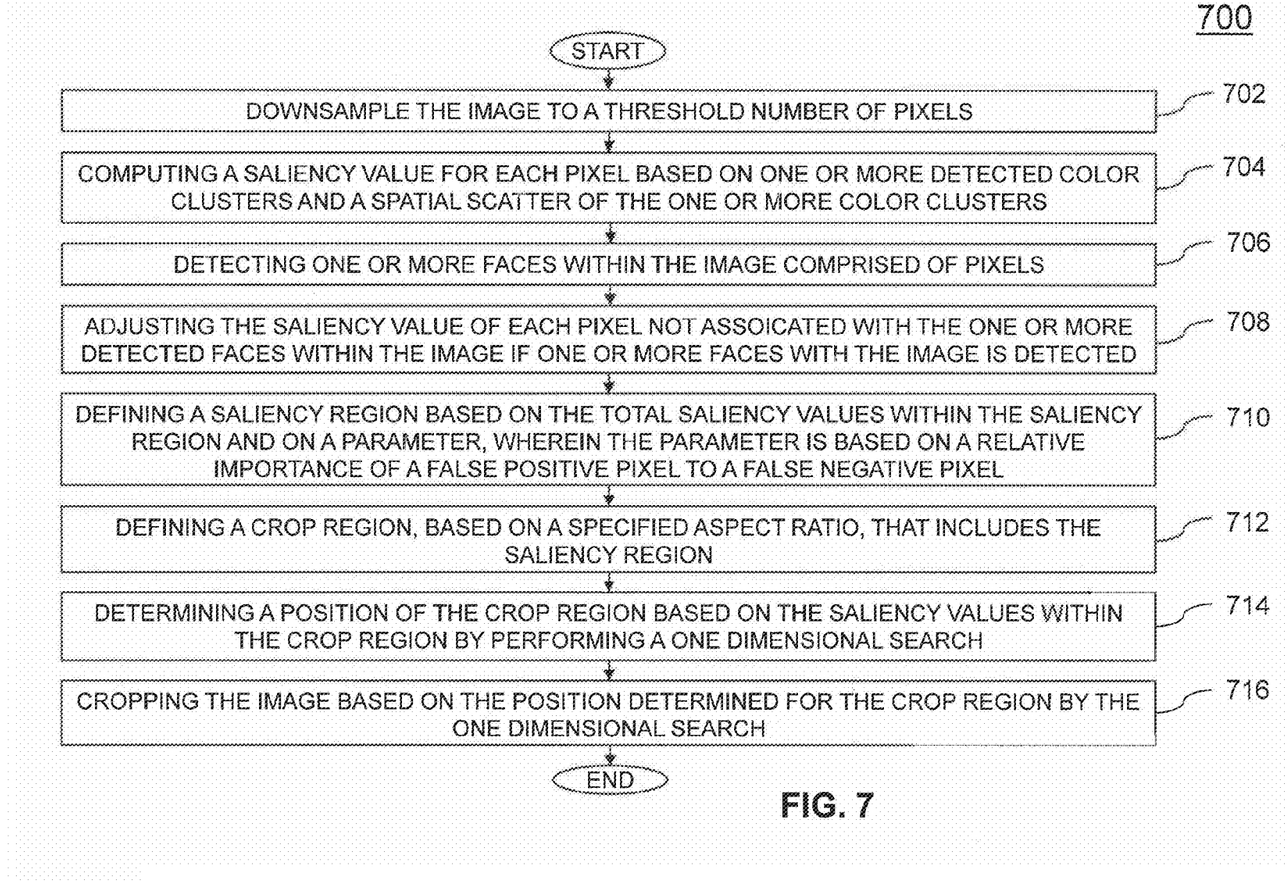
FIG. 7 illustrates a method for automatic image cropping, according to an embodiment of the present invention.

FIG. 7 illustrates method 700 for image cropping, according to an embodiment of the present invention. In the example shown in FIG. 7, the method starts with step 702 that includes downsampling an image to a threshold number of pixels. Step 704 continues by computing a saliency value for each pixel based on one or more detected color clusters and a spatial scatter of the one or more color clusters. Step 706 continues by detecting one or more faces within the image. Step 708 continues by adjusting the saliency value of each pixel not associated with the one or more detected faces within the image if one or more faces within the image are detected. Step 710 continues by defining a saliency region based on a total value of the saliency values within the saliency region and on a parameter, wherein the parameter value is based on a relative importance of a false positive pixel to a false negative pixel. Step 712 continues by defining a crop region, based on a specified aspect ratio that includes the saliency region. Step 714 continues by determining a position of the crop region based on the saliency values within the crop region by performing a one dimensional search. Step 716 concludes by cropping the image based on the position determined for the crop region by the one dimensional search.

X. Client/Server Configuration

Figure 8:
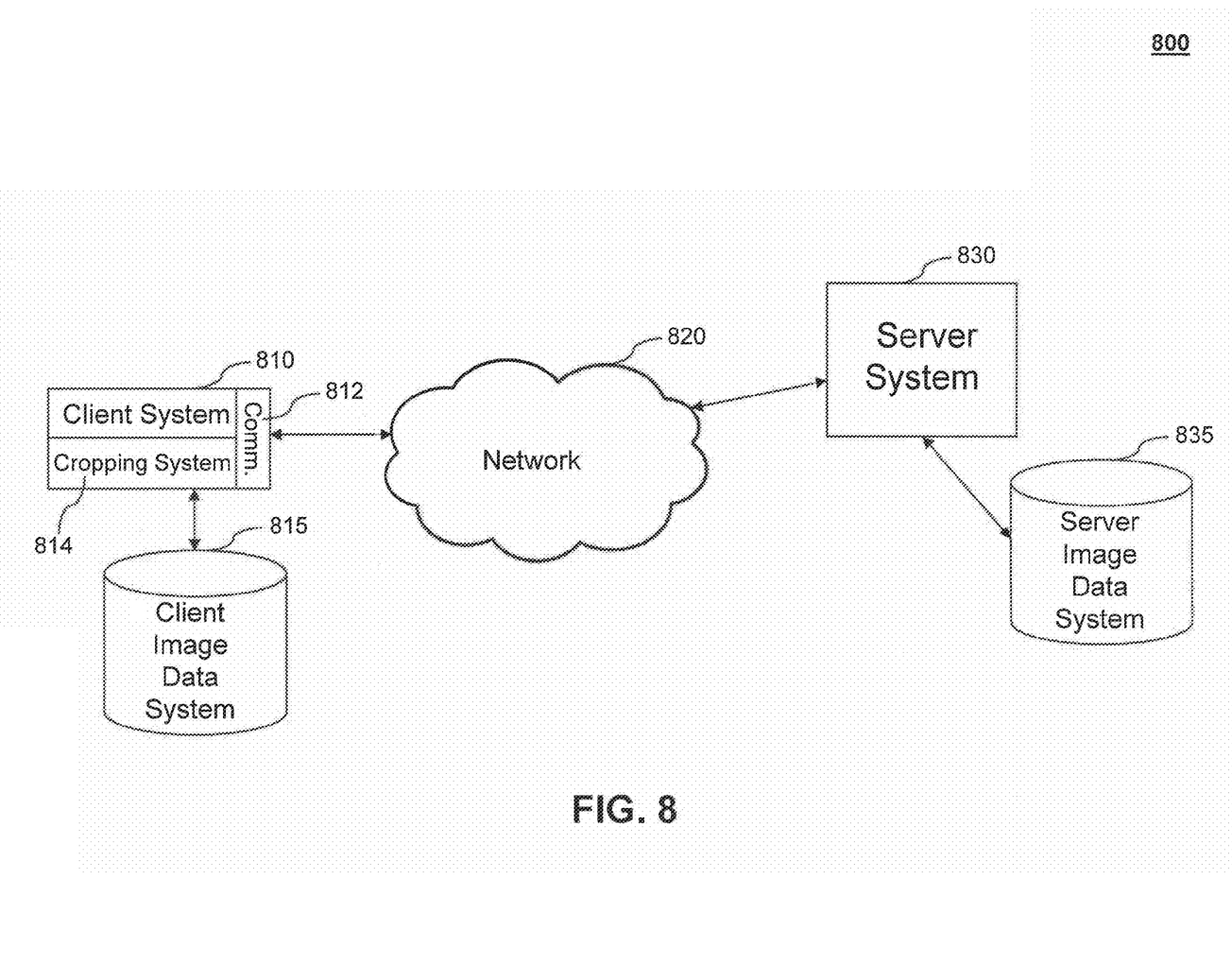
FIG. 8 illustrates a client/server computer configuration to perform automatic image cropping, according to an embodiment of the present invention.

FIG. 8 illustrates system 800 of an automatic image cropping system, according to an embodiment of the present invention. In the example shown in FIG. 8, system 800 illustrates a client-server based image cropping system. System 800 includes a client system 810, client image data system 815, a communication network 820, a server system 830, and server image data system 835.

Client system 810 and cropping system 830 each perform a portion of the downsampling, saliency analyzing, face detection, blending of detected faces, determining a saliency region, defining a crop region, and generating a border on a raw image as has been previously described. In an embodiment, the raw image is initially stored in client image data system 815. In another embodiment the raw image is initially stored in server image data system 835 and is transmitted to client system 810 using server system 830 and communication network 820.

While either client system 810 or server system 830 can execute all of the functionality regarding automatic image cropping as described above, in a client-server configuration the tasks are apportioned between client system 810 and server system 830 based on a number of factors as known to one of ordinary skill in the art.

In an embodiment, client system 810 may contain a relatively low amount of processing power as compared to server system 830 and thus would only capture an image using an image capture device, not shown, and then sending the image to sever system 830, utilizing communication system 812 through communication network 820, where server system 830 would perform the image cropping components, e.g., the downsampling, saliency analyzing, face detection, blending of detected faces, determining a saliency region, defining a crop region, and the generating of a border. In another embodiment, the application of the final crop, as previously discussed, would be performed by client system 810 using cropping system 814 with software specifically tuned for the type of device on which client system 810 has been implemented. Client system 810, for example, could exist on a mobile communication device with the ability to capture an image as well as to perform some degree of image processing.

In an embodiment, client system 810 would cause the cropped image to be displayed. Display of the cropped image can be accomplished using a built in presentation device, not shown, or sent to an external presentation device.

In other embodiments the apportioning of tasks between client system 810 and server system 830 contains no restrictions as the amount of data being passed between the processes previously described is relatively small in comparison to the initial raw image.

XI. Example Computer System Implementation

Aspects of the present invention shown in FIGS. 1-8, or any part(s) or function(s) thereof, may be implemented using hardware, software modules, firmware, tangible computer readable media having instructions stored thereon, or a combination thereof and may be implemented in one or more computer systems or other processing systems.

Figure 9:
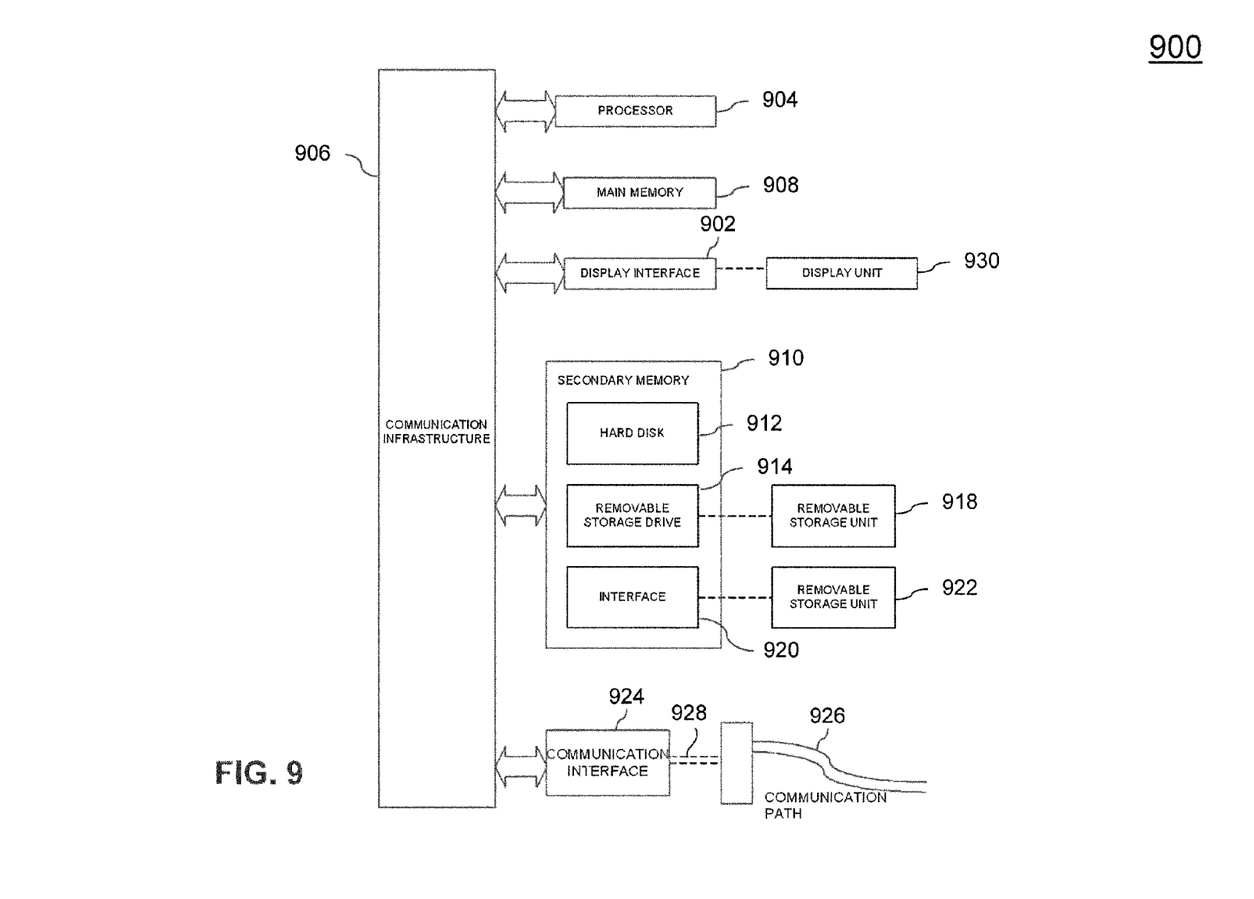
FIG. 9 illustrates a computer system to perform automatic image cropping, according to an embodiment of the present invention.

FIG. 9 illustrates an example computer system 900 in which embodiments of the present invention, or portions thereof, may by implemented as computer-readable code. For example, system 100 may be implemented in computer system 900 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-7.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 900. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 904 may be a special purpose or a general purpose processor device. As will be appreciated by persons skilled in the relevant art, processor device 904 may also be a single processor in a multi-core/multiprocessor system, such system operating alone, or in a cluster of computing devices operating in a cluster or server farm. Processor device 904 is connected to a communication infrastructure 906, for example, a bus, message queue, network, or multi-core message-passing scheme.

Computer system 900 also includes a main memory 908, for example, random access memory (RAM), and may also include a secondary memory 910. Secondary memory 910 may include, for example, a hard disk drive 912, removable storage drive 914. Removable storage drive 914 may comprise a floppy disk drive, a magnetic tape drive, an optical disk drive, a flash memory, or the like. The removable storage drive 914 reads from and/or writes to a removable storage unit 918 in a well known manner. Removable storage unit 918 may comprise a floppy disk, magnetic tape, optical disk, etc. which is read by and written to by removable storage drive 914. As will be appreciated by persons skilled in the relevant art, removable storage unit 918 includes a computer usable storage medium having stored therein computer software and/or data.

Computer system 900 (optionally) includes a display interface 902 (which can include input/output devices such as keyboards, mice, etc.) that forwards graphics, text, and other data from communication infrastructure 906 (or from a frame buffer not shown) for display on display unit 930.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Communications interface 924 may include a modem, a network interface (such as an Ethernet card), a communications port, a PCMCIA slot and card, or the like. Software and data transferred via communications interface 924 may be in the form of signals, which may be electronic, electromagnetic, optical, or other signals capable of being received by communications interface 924. These signals may be provided to communications interface 924 via a communications path 926. Communications path 926 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 918, removable storage unit 922, and a hard disk installed in hard disk drive 912. Computer program medium and computer usable medium may also refer to memories, such as main memory 908 and secondary memory 910, which may be memory semiconductors (e.g. DRAMs, etc.).

Computer programs (also called computer control logic) are stored in main memory 908 and/or secondary memory 910. Computer programs may also be received via communications interface 924. Such computer programs, when executed, enable computer system 900 to implement the present invention as discussed herein. In particular, the computer programs, when executed, enable processor device 904 to implement the processes of the present invention, such as the stages in the method illustrated by flowchart 700 of FIG. 7 discussed above. Accordingly, such computer programs represent controllers of the computer system 900. Where the invention is implemented using software, the software may be stored in a computer program product and loaded into computer system 900 using removable storage drive 914, interface 920, and hard disk drive 912, or communications interface 924.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

CONCLUSION

Embodiments described herein provide methods and apparatus for the automatic cropping of images. The summary and abstract sections may set forth one or more but not all exemplary embodiments of the present invention as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A client based method for image cropping, comprising:
   capturing an image;
   uploading the captured image to an image cropping system, wherein the cropping system performs an analysis of the captured image comprising:
      downsampling the image to a threshold number of pixels;
      computing a saliency value for each pixel based on one or more detected color clusters and a spatial scatter of the one or more color clusters;
      detecting one or more faces within the image;
      adjusting the saliency value of each pixel not associated with the one or more detected faces within the image if one or more faces within the image are detected; and
      defining a saliency region based on a total value of the saliency values within the saliency region and on a parameter value, wherein the parameter value is based on a relative importance of a false positive pixel to a false negative pixel;
   receiving cropping coordinates from the image cropping system; and cropping the captured image based on the received cropping coordinates.

2. The method of claim 1, further comprising causing the cropped image to be displayed.

3. The method of claim 1, wherein the analysis of the captured image comprising further comprises:
 determining a position of the crop region, based on the saliency values within the crop region, by performing a one dimensional search; and
 cropping the image based on the one dimensional search.

4. The method of claim 3, further comprising comparing a quality value of the cropped image based on the position determined by the one dimensional search to a quality value of the cropped image when positioned at a default position wherein if the quality value of the cropped image at the default position is greater than a threshold amount above the quality value of the cropped image based on the position determined by the one dimensional search then the cropped image is placed at the default position.

5. The method of claim 3, wherein the determining a position of the crop region is based on maximizing the total value of saliency values within the crop region.

6. The method of claim 1, wherein the saliency value of each pixel of the one or more detected faces is greater than other saliency values.

7. The method of claim 6, wherein a total saliency value of a first detected face is greater than a total saliency value of a second detected face.

8. The method of claim 1, further comprising determining the number of color clusters based on a non-parametric density estimation and a mean shift algorithm.

9. The method of claim 1, further comprising producing a confidence measure of the cropped image indicating a likelihood that a portion of a detected face has been cropped.

10. The method of claim 1, further comprising determining a no-crop region, wherein a pixel within the no-crop region is not present within the crop region.

11. The method of claim 10, further comprising expanding the no-crop region to include a border generated around the no-crop region.

12. A client based system for image cropping, comprising:
 an image capture device configured to capture an image;
 a communication system configured to:
  upload the captured image to a server system comprising;
   a downsampling system configured to downsample an image to a threshold number of pixels;
   a saliency analyzer configured to compute a saliency value for each pixel based on one or more detected color clusters and a spatial scatter of the one or more color clusters;
   a face detector configured to detecting one or more faces within the image, wherein the saliency value of each pixel not associated with the one or more detected faces within the image is adjusted if one or more faces within the image is detected; and
   a search system configured to:
    define a saliency region based on a total value of saliency values within the saliency region and on a parameter, wherein the parameter value is based on a relative importance of a false positive pixel to a false negative pixel; and
    define a crop region, based on a specified aspect ratio, which includes the saliency region; and
  receive cropping coordinates from the server system; and
 a cropping system configured to crop the captured image based on the received cropping coordinates.

13. The system of claim 12, further comprising a presentation device configured to display the cropped image.

14. The system of claim 12, wherein the server system further comprises:
 the search system configured to determine a position of the crop region, based on the saliency values within the crop region, by performing a one dimensional search; and
 a cropping system configured to crop the image based on the one dimensional search.

15. The system of claim 14, wherein the server system compares a quality value of the cropped image based on the position determined by the one dimensional search to a quality value of the cropped image when positioned at a default position wherein if the quality value of the cropped image at the default position is greater than a threshold amount above the quality value of the cropped image based on the position determined by the one dimensional search then the cropped image is placed at the default position.

16. The system of claim 12, wherein the face detector generates a border around each of the one or more detected faces.

17. The system of claim 12, wherein the search system determines a position of the crop region based on maximizing the total value of saliency values within the crop region.

18. The system of claim 12, wherein the saliency value of each pixel of the one or more detected faces is greater than other saliency values.

19. The system of claim 12, further comprising determining the number of color clusters based on a non-parametric density estimation and a mean shift algorithm.

20. The system of claim 12, wherein the search system is further configured to determine a no-crop region, wherein a pixel within the no-crop region is not present within the crop region.

* * * * *